July 2, 1929.  C. E. PHARE  1,719,193
SWIVEL COUPLING FOR COASTER CARS
Filed June 26, 1928
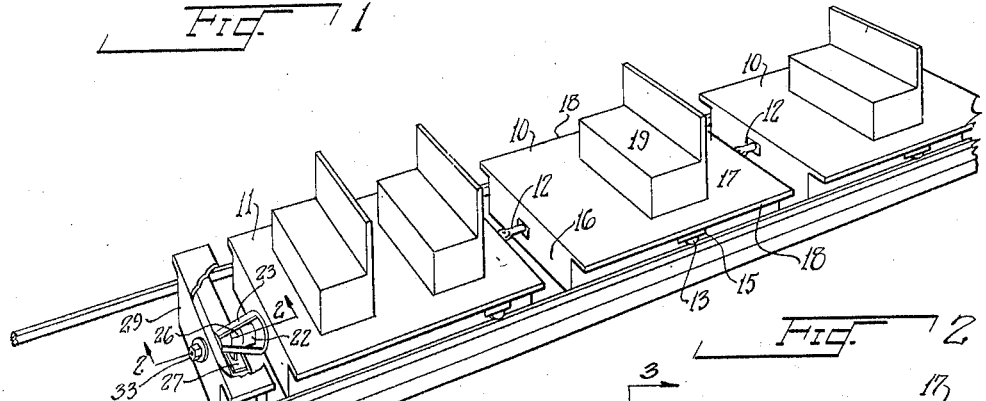
INVENTOR
Carl E. Phare
BY
ATTORNEY Patented July 2, 1929.

1,719,193

UNITED STATES PATENT OFFICE.

CARL E. PHARE, OF PORTLAND, OREGON.

SWIVEL COUPLING FOR COASTER CARS.

Application filed June 26, 1928. Serial No. 288,471.

This invention relates to an attachment for roller coaster cars such as are in common use at amusement parks.

The primary object of the present invention is to provide a coupling between the pilot car and the lead car.

A further object is to provide a pilot car supporting the front of the lead car, the lead car supporting the front of the following car.

The invention is illustrated in the accompanying drawings, in which:

Figure 1 is a perspective view of the roller coaster train and a section of track.

Figure 2 is a section on line 2—2 of Figure 1.

Figure 3 is a section on line 3—3 of Figure 2.

The roller coaster train is made up of two following cars 10, a lead car 11 and a pilot car 29. The lead car is coupled to the following car, which in turn is coupled to its following car by ordinary connections 12. The cars are supported on rails by a pair of wheels 13, one wheel on each side of each car, the said cars stabilizing one another through the couplings 12.

The wheels are carried by a removable pin 14 which is supported in an inverted U-shaped bracket 15. The cars are formed with a body 16 supporting a platform 17 which is extended over the wheels on each side to provide running-boards 18. Centrally located on the platform of each car is a seat 19. The train runs on a track 20 carried by stringers 21 which is part of the ordinary construction of a roller coaster.

The lead car 11 is connected to the pilot car, which is not designed to carry passengers, through a bracket 22 secured to the body 16 of the said lead car. The bracket has outwardly extending arms 23 (which are T-shaped in cross section) cast integral with the hubs 24 and 25 between which is fitted a hub portion 26 of the upright 27 carried on the frame 28 of the pilot car 29.

A shaft 30 passes through the aligned bore formed by the aligned hubs 24, 25 and 26 and is secured at the far end of the bracket 22 by riveting, as at 31. The said shaft projects through the front of the pilot car 29 and is threaded, as at 32, to receive a nut 33. Bearing plates 34 and 36 are placed between the nut 33 and the frame and the hub and the frame respectively and are secured by bolts 35. The bracket 22 is bolted to the frame of the lead car by bolts 37 which pass through holes in the flange 38. Washers 39 may be provided where necessary.

What is claimed to be new is:

1. A pilot car for roller coaster trains, comprising a frame, an upright hub carried by the frame, a bracket having a separated hub portion carried by the lead car of the train, and a shaft connecting the bracket and the upright hub, thereby forming pivotal connection between the pilot car and the lead car.

2. A pilot car for roller coaster trains, comprising a frame, an upright hub carried by the frame, a lead car in the train, a bracket secured to the body of the lead car, a separated hub portion integral with the bracket adapted to receive the hub carried by the frame of the pilot car, a shaft passing through the aligned bore of the hubs thereby forming pivotal connection between the pilot car and the lead car, a pair of wheels for the lead car and a pair of wheels for the pilot car, the lead car receiving support from the wheels of the pilot car and the pilot car receiving support from the wheels of the lead car through the pivotal connection.

3. A pilot car for roller coaster trains, comprising a frame, an upright hub carried by the frame, a lead car in the train, a bracket secured to the body of the lead car, a rear hub portion integral with the bracket, converging arms integral with the bracket extended beyond the rear hub portion, a front hub portion integral with and carried by the arms, the said hub portions being aligned and adapted to receive the upright hub carried by the frame of the pilot car between them, a shaft passing through the aligned bore thus formed thereby forming pivotal connection between the pilot car and the lead car, a pair of wheels for the lead car and a pair of wheels for the pilot car, the lead car receiving support from the wheels of the pilot car and the pilot car receiving support from the wheels of the lead car through the pivotal connection.

In testimony whereof I affix my signature.

CARL E. PHARE.